(12) United States Patent
Wu et al.

(10) Patent No.: US 6,479,197 B1
(45) Date of Patent: Nov. 12, 2002

(54) METHOD OF MANUFACTURING TWO-COLOR FILTER

(75) Inventors: Richard Wu, Hsinchu (TW); Jau-Jiu Ju, Hsinchu Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 93 days.

(21) Appl. No.: 09/698,966

(22) Filed: Oct. 27, 2000

(30) Foreign Application Priority Data

Jul. 7, 2000 (TW) ........................................ 089113548

(51) Int. Cl.$^7$ ................................................. G02B 5/20
(52) U.S. Cl. ........................................... 430/7; 430/321
(58) Field of Search ..................................... 430/7, 321

(56) References Cited

U.S. PATENT DOCUMENTS 3,914,464 A * 10/1975 Thomasson et al. .......... 427/54
5,696,750 A   12/1997 Katayama ................... 369/112

FOREIGN PATENT DOCUMENTS

JP        56-033609 A  *  4/1981
JP        59-152407 A  *  8/1984

* cited by examiner

*Primary Examiner*—John A. McPherson
(74) *Attorney, Agent, or Firm*—J.C. Patents

(57) ABSTRACT

A method of manufacturing a two-color filter. The method includes forming a first metallic layer over a substrate and then forming a second metallic layer over the first metallic layer. A patterned photoresist layer is formed over the second metallic layer. A portion of the first metallic layer and the second metallic layer in region not covered by the photoresist layer are removed by etching to form a third metallic layer and a fourth metallic layer over the substrate respectively. An optical film is formed over the photoresist layer and the substrate such that the optical film is able to cover only a portion of the sidewalls of the fourth metallic layer or a portion of the third metallic layer. The extent of coverage by the optical film on the sidewalls can be controlled through careful adjustment of the thickness of the first and the second metallic layer. Finally, the third metallic layer, the fourth metallic layer and the photoresist layer are removed so that an optical film previously attached to the sidewalls of the third and fourth metallic layer remains over the substrate.

14 Claims, 2 Drawing Sheets

METHOD OF MANUFACTURING TWO-COLOR FILTER

CROSS-REFERENCE TO RELATED APPLICATION

This application claims the priority benefit of Taiwan application serial no. 89113548, filed Jul. 7, 2000.

BACKGROUND OF THE INVENTION

1. Field of Invention

The present invention relates to a method of manufacturing a two-color filter.

2. Description of Related Art

In U.S. Pat. No. 5,696,750 titled "Optical head apparatus for different type of disks", Japanese company NEC has proposed an optical head capable of reading different types of optical disks such as CD and DVD. The design employs two light sources of a different wavelength and an object lens. To provide dual focus, various types of holographic optical elements (HOE) design and aperture-limiting elements for adjusting the effective numerical aperture including a combination of the two elements has been proposed in the article.

The aperture-limiting element is a rectangular glass plate having a circular hole in the middle. Diameter of the hole is smaller than the effective diameter of the object lens. A phase compensation layer and an interference filter are sequentially plated over the area outside the hole. Therefore, light beam having a wavelength of 635 nm is permitted to pass through while a light beam having a wavelength of 785 nm is completely reflected back. Meanwhile, the hole permits both 635 nm and 785 nm light to pass through unimpeded. Consequently, when light containing two different wavelengths is beamed onto the aperture-limiting element and focused by the object lens, a pair of focuses capable of reading different types of optical disks is produced.

Although the function and structure of the aperture-limiting element has been disclosed in the aforementioned U.S. Patent, method of manufacturing the aperture-limiting element remains unknown.

SUMMARY OF THE INVENTION

Accordingly, one object of the present invention is to provide a method of manufacturing a two-color filter capable of producing a pair of focuses for reading different types of optical disks.

To achieve these and other advantages and in accordance with the purpose of the invention, as embodied and broadly described herein, the invention provides a method of manufacturing a two-color filter. The method includes the steps: (a) providing a substrate; (b) forming a first metallic layer over the substrate; (c) forming a second metallic layer over the first metallic layer; (d) forming a photoresist layer over a desired region of the second metallic layer; (e) etching to remove a portion of the first metallic layer and the second metallic layer in region not covered by the photoresist layer to form a third metallic layer and a fourth metallic layer over the substrate respectively; (f) forming an optical film over the photoresist layer and the substrate such that the optical film is able to cover only a portion of the sidewalls of the fourth metallic layer or a portion of the third metallic layer through careful adjustment of the thickness of the first and the second metallic layer, or in other words, the third and the fourth metallic layer; and (g) removing the third metallic layer and the fourth metallic layer and at the same time stripping off the photoresist layer so that an optical film previously attached to the sidewalls of the third and fourth metallic layer remains over the substrate.

The invention also provides an alternative method of manufacturing a two-color filter. The alternative method includes the steps: (a) providing a substrate; (b) forming a first metallic layer over the substrate; (c) forming a photoresist layer over a desirable region above the first metallic layer; (d) etching to remove the exposed first metallic layer so that a second metallic layer is formed over the substrate; (e) forming an optical film over the photoresist layer and the substrate such that the optical film is able to cover only a portion of the sidewalls of the second metallic layer through carefully adjusting the thickness of the first metallic layer, or in other words, the second metallic layer; and (f) removing the second metallic layer and stripping off the photoresist layer so that an optical film previously attached to the sidewalls of second metallic layer remains over the substrate.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1A:
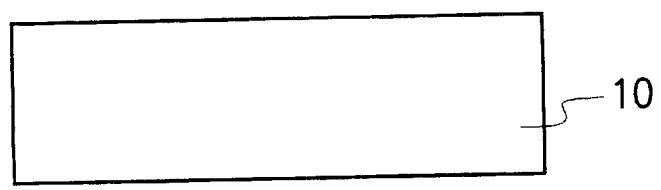
FIGS. 1A through 1G are schematic cross-sectional views showing the progression of steps for manufacturing a two-color filter according to one preferred embodiment of this invention.
Figure 1B:
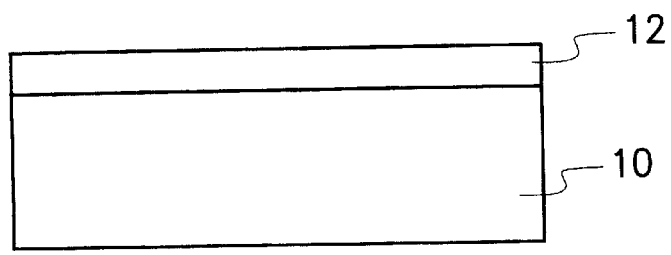

Reference will now be made in detail to the present preferred embodiments of the invention, examples of which are illustrated in the accompanying drawings. Wherever possible, the same reference numbers are used in the drawings and the description to refer to the same or like parts.

FIGS. 1A through 1G are schematic cross-sectional views showing the progression of steps for manufacturing a two-color filter according to one preferred embodiment of this invention.

First, as shown in FIG. 1A, a substrate (for example, a glass substrate) 10 is provided. The following steps are carried out in sequence to clean the glass substrate 10: (a) washing with de-ionized water for about 5 minutes; (b) applying ultrasound for 15 minutes; (c) washing with de-ionized water for 5 minutes; (d) vibrating in an acetone solution for 5 minutes; (e) washing with de-ionized water for 5 minutes; (f) vibrating in an acetone solution for 15 minutes; (g) washing with de-ionized water for 5 minutes; and (h) blowing gaseous nitrogen over the glass substrate 10.

As shown in FIG. B, a sputtering method is used to form a first metallic layer (for example, an aluminum layer) 12 with a thickness of between 2.0~2.5 µm over the substrate 10.

Figure 1C:
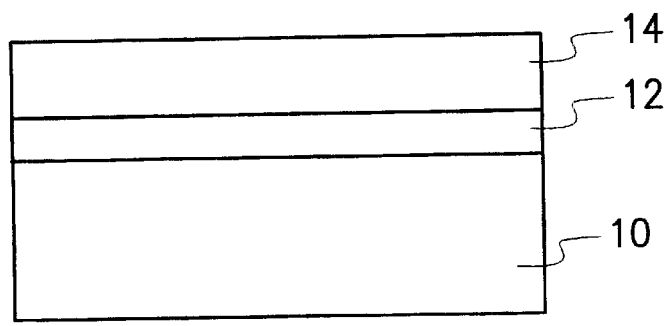

As shown in FIG. 1C, a chemical reaction method is used to form a second metallic layer (for example, a nickel layer) 14 with a thickness of about 6~8 µm is formed over the first metallic layer 12.

Figure 1D:
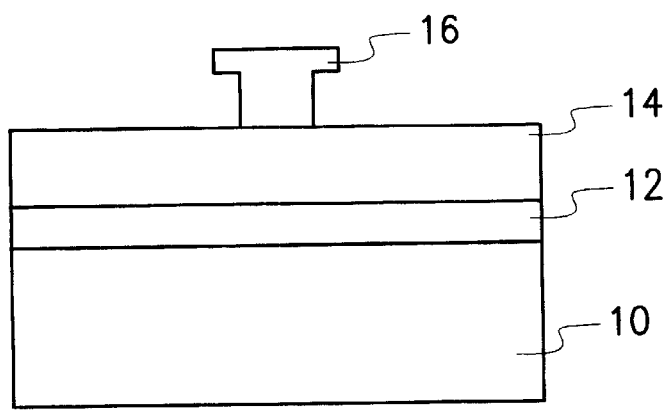

As shown in FIG. 1D, photolithographic techniques are applied to form a patterned photoresist layer 16 over the second metallic layer 14. The photoresist layer 16 has a T-shaped cross-sectional profile, for example.

Figure 1E:
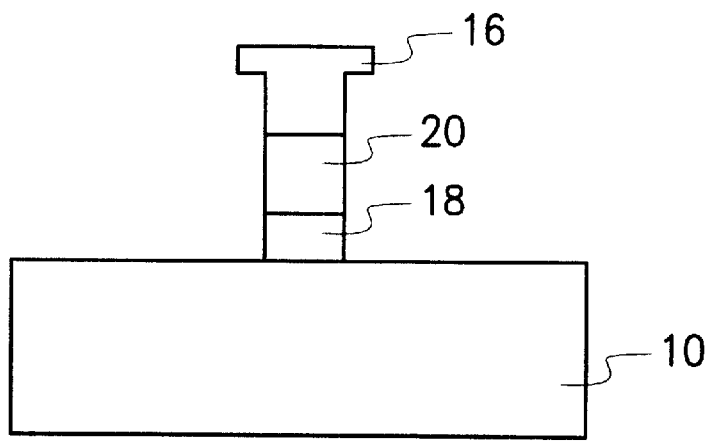

As shown in FIG. 1E, wet etching is conducted is sequence (for example, applying sulfuric acid and aluminum etching agent in sequence) to remove a portion of the exposed first metallic layer 12 and the second metallic layer 14. Ultimately, a third metallic layer 18 (an aluminum layer) and a fourth metallic layer 20 (a nickel layer) are formed.

Figure 1F:
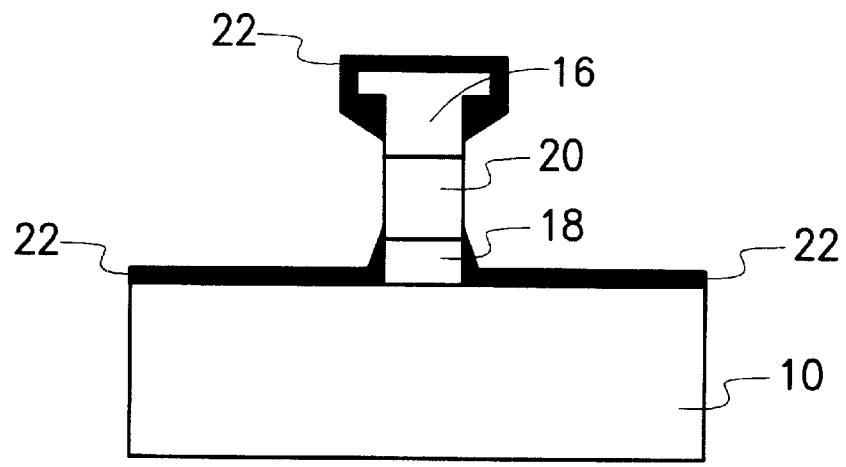

As shown in FIG. 1F, an optical film 22 (a multi-layered film such as $SiO_2/TiO_2$ film) is formed over the photoresist layer 22 and the substrate 10. The optical film 22 covers only a portion of the sidewalls of the fourth metallic layer 20 or a portion of the sidewalls of the third metallic layer 18. In general, sidewall coverage by the optical film 22 can be controlled through careful adjustment of the thickness of the first metallic layer 12 and the second metallic layer 14. In other words, thickness of the third metallic layer 18 and the fourth metallic layer 20.

Figure 1G:
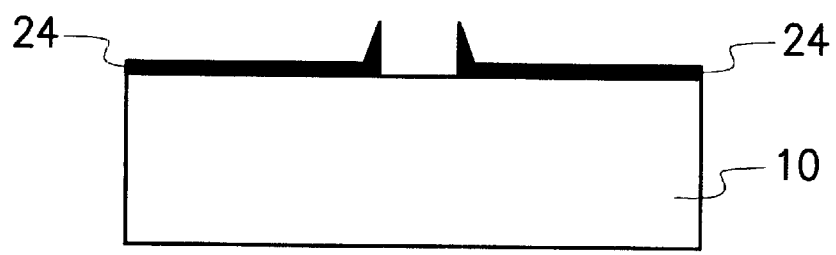

As shown in FIG. 1G, wet etching is conducted (using sulfuric acid and aluminum etching agent in sequence) to remove the fourth and the third metallic layer (20 and 18). Meanwhile, the photoresist layer 16 is stripped away at the same time. Ultimately, an optical film 24 remains on top of the substrate 10 to form a two-color filter.

In an alternative embodiment of this invention, a single metallic layer (for example, an aluminum layer) is formed over the substrate 10 instead of the first metallic layer 12 and the second metallic layer 14. The single metallic layer can have a thickness between 7~10 $\mu$m. Aside from forming just one metallic layer over the substrate, the alternative embodiment follows identical steps as the aforementioned embodiment.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of manufacturing a two-color filter, comprising the steps of:

providing a substrate;

forming a first metallic layer over the substrate, wherein the first metallic layer includes an aluminum layer;

forming a second metallic layer over the first metallic layer;

forming a photoresist layer over a desired region of the second metallic layer;

etching to remove a portion of the first metallic layer and the second metallic layer in region not covered by the photoresist layer to form a third metallic layer and a fourth metallic layer over the substrate respectively;

forming an optical film over the photoresist layer and the substrate such that the optical film is able to cover only a portion of the sidewalls of the fourth metallic layer or a portion of the third metallic layer through careful adjustment of the thickness of the first and the second metallic layer, or in other words, the third and the fourth metallic layer; and removing the third metallic layer and the fourth metallic layer and at the same time stripping off the photoresist layer so that an optical film previously attached to the sidewalls of the third and fourth metallic layer remains over the substrate.

2. The method of claim 1, wherein the substrate includes a glass substrate.

3. The method of claim 1, wherein the aluminum layer has a thickness between about 2.0~2.4 $\mu$m.

4. The method of claim 1, wherein the second metallic layer includes a nickel layer.

5. The method of claim 4, herein the nickel layer has a thickness between about 6~8 $\mu$m.

6. The method of claim 1, wherein the optical film includes a $SiO_2/TiO_2$ composite layer.

7. The method of claim 6, wherein the $SiO_2/TiO_2$ composite optical film has a thickness between about 1.8~2.0 $\mu$m.

8. The method of claim 1, wherein the photoresist layer has a T-shaped cross-sectional profile.

9. A method of manufacturing a two-color filter, comprising the steps of:

providing a substrate;

forming a first metallic layer over the substrate;

forming a photoresist layer over a desirable region above the first metallic layer, wherein the photoresist lay has a T-shaped cross-sectional profile;

etching to remove the exposed first metallic layer so that a second metallic lay is formed over the substrate;

forming an optical film over the photoresist layer and the substrate such that the optical film is able to cover only a portion of the sidewalls of the second metallic layer through carefully adjusting the thickness of the first metallic layer, or in other words, the second metallic layer; and removing the second metallic layer and stripping off the photoresist layer so that an optical film previously attached to the sidewalls of second metallic layer remains over the substrate.

10. The method of claim 9, wherein the substrate includes a glass substrate.

11. The method of claim 9, wherein the first metallic layer includes an aluminum layer.

12. The method of claim 11, wherein the aluminum layer has a thickness between about 7~10 $\mu$m.

13. The method of claim 9, wherein the optical film includes a $SiO_2/TiO_2$ composite layer.

14. The method of claim 13, wherein the $SiO_2/TiO_2$ composite optical film has a thickness between about 1.8~2.0 $\mu$m.

* * * * *